June 19, 1956     D. L. DU HAMELL, JR     2,750,782
LAUNDRY APPARATUS
Filed Aug. 4, 1955     4 Sheets-Sheet 1
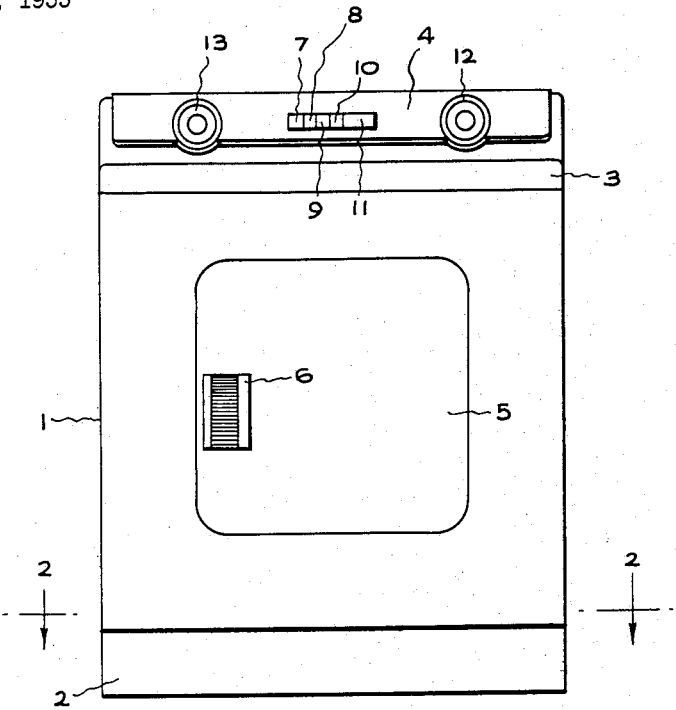
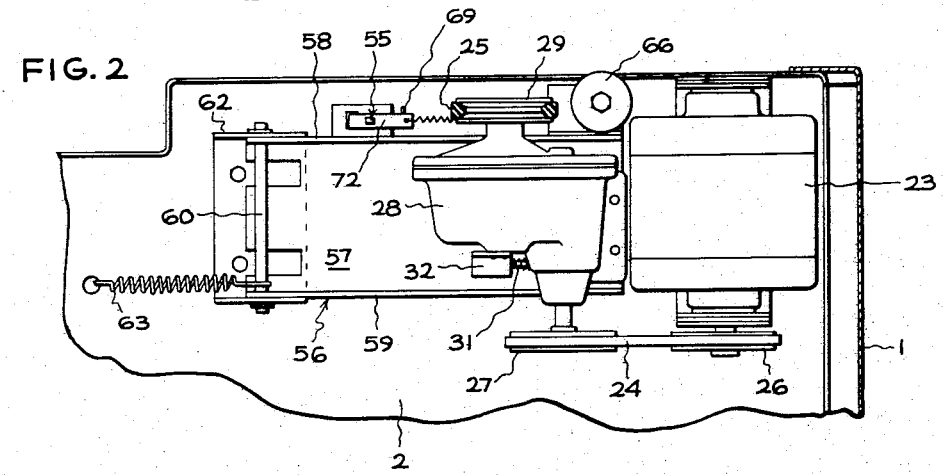
INVENTOR.
DANIEL L. DU HAMELL, JR.
BY Harry F. Manbeck, Jr.
HIS ATTORNEY June 19, 1956     D. L. DU HAMELL, JR     2,750,782
LAUNDRY APPARATUS Filed Aug. 4, 1955     4 Sheets-Sheet 2

INVENTOR.
DANIEL L. DU HAMELL, JR.

BY Harry F. Manbeck, Jr.
HIS ATTORNEY

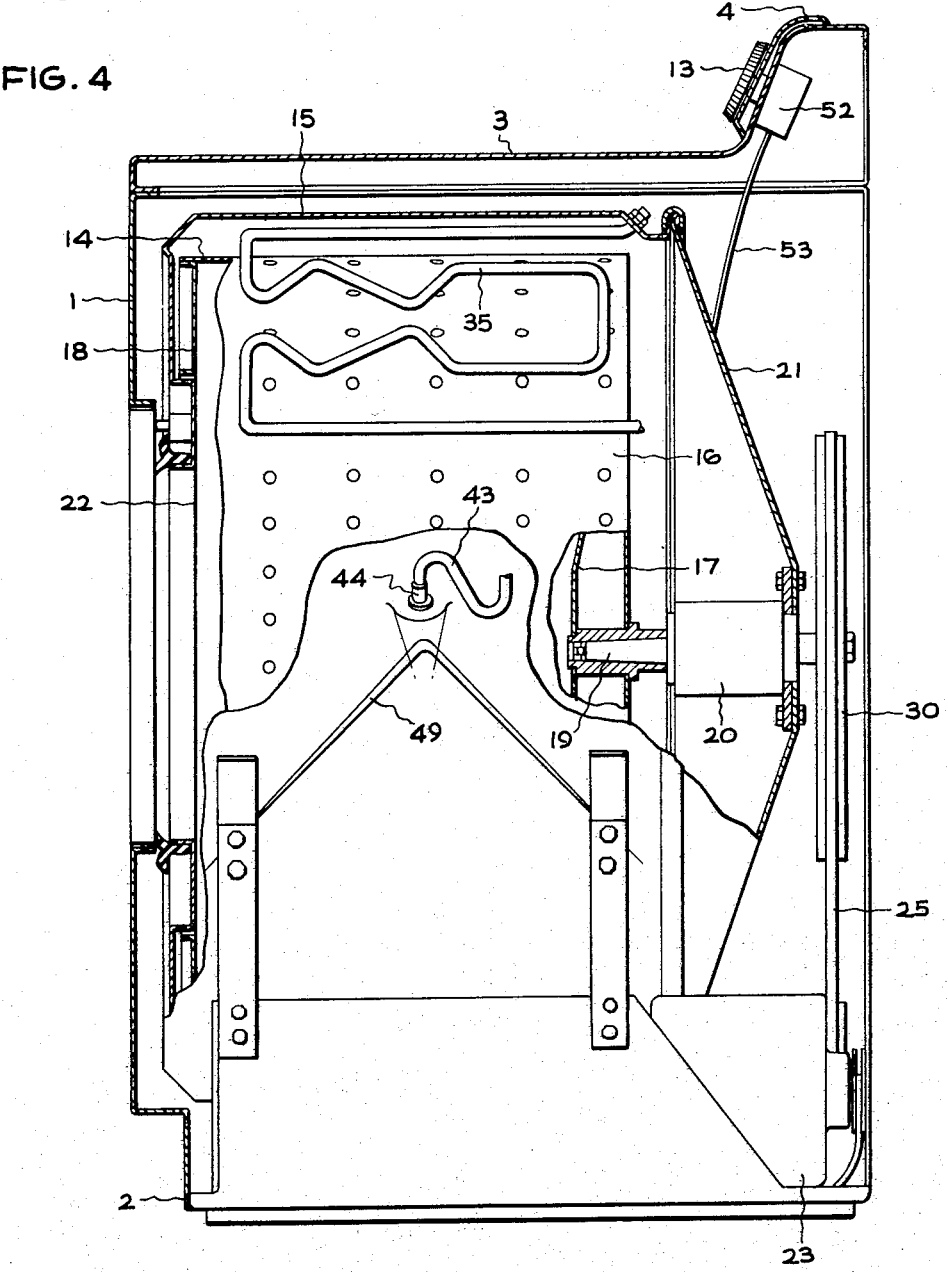

June 19, 1956   D. L. DU HAMELL, JR   2,750,782
LAUNDRY APPARATUS
Filed Aug. 4, 1955   4 Sheets-Sheet 4
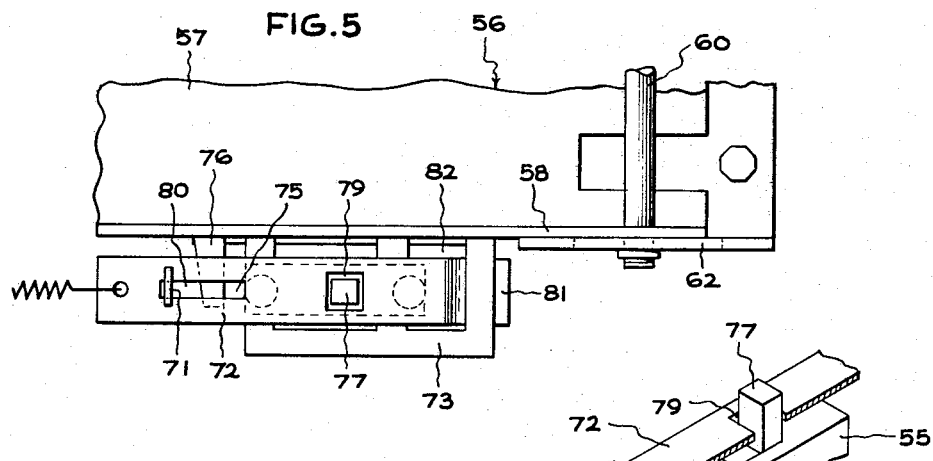
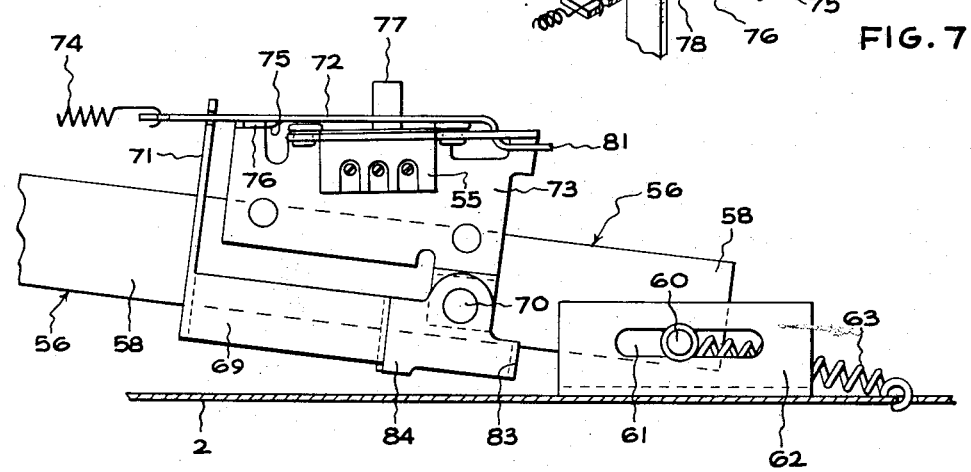
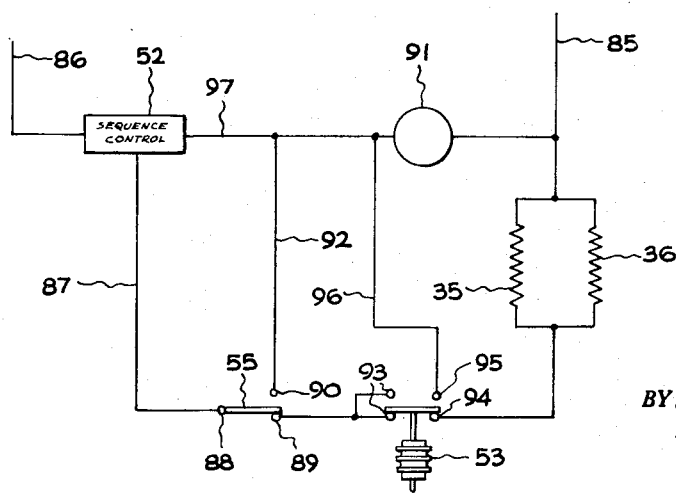
INVENTOR.
DANIEL L. DU HAMELL, JR.
BY Harry F. Manbeck, Jr.
HIS ATTORNEY

United States Patent Office 2,750,782
Patented June 19, 1956

2,750,782

LAUNDRY APPARATUS

Daniel L. Du Hamell, Jr., Marblehead, Mass., assignor to General Electric Company, a corporation of New York Application August 4, 1955, Serial No. 526,413

6 Claims. (Cl. 68—140)

My invention relates to laundry apparatus and more particularly to such apparatus including flexible belts in the drive means for the clothes-treating basket.

For reasons of cost and simplicity, flexible belts are commonly used in the drive means of domestic laundry machines. In certain horizontal axis machines, i. e., machines in which the clothes-treating basket rotates about a horizontal axis, a pair of such belts may be advantageously employed. One of the belts connects the drive motor to the input pulley of a power transmission means, and the other belt connects the output pulley of the transmission means to the clothes basket. The transmission means may, for example, comprise a speed reduction or changing device such as a multi-speed transmission gear assembly.

With such a belt drive there is, of course, the risk that one of the belts will fail during use. In a machine including high wattage air or water heaters the stoppage of basket rotation resulting from this belt failure can result in damage to the machine and/or the clothes unless the heaters are de-energized upon the belt failure. Unless the basket is rotating, there may be insufficient heat transfer from the area immediately adjacent to the heaters causing overheating to occur. Thus it is desirable that suitable switch means be automatically actuated upon failure of either belt so as to turn off the heaters, either alone or by the complete termination of machine operation.

Accordingly, it is the object of my invention to provide new and improved means for operating a safety switch upon the failure of either belt in a laundry machine drive of the above type.

It is another object of my invention to provide a circuit opening, safety device which is actuated by the failure of either belt in a two-belt drive for a laundry machine, and which may be simply and easily reset upon the replacement of the broken belt.

In carrying out my invention I provide a laundry machine having a rotatable clothes-treating basket and a drive motor therefor. The basket is driven from the motor by a drive including a power transmission means and a pair of belts, the belts being connected respectively to input and output pulleys of the transmission means. By my invention means are provided whereby a safety switch is operated to protect the machine upon the failure of either of the belts. These means include a movable frame mounting the power transmission means and spring means biasing the frame so as to apply tension to the belts. The spring means are effective to cause a movement of the frame upon failure of either of the belts and a safety switch is so mounted that it is operated from one position to the other by this movement. Thereby, the switch is automatically operated upon the failure of either of the belts.

The novel features which I believe to be characteristic of my invention are pointed out with particularity in the appended claims. My invention itself, both as to its organization and method of operation, may be best understood by reference to the following description taken in conjunction with the accompanying drawings in which:

Fig. 1 is a front elevational view of a domestic laundry machine having a basket drive including a pair of belts;

Fig. 2 is a fragmentary cross-sectional view taken on the line 2—2 of Fig. 1;

Fig. 4 is a side elevational view of the machine, partially in section and with certain surfaces broken away to show details;

Fig. 5 is a fragmnetary plan view of the belt safety means embodying my invention, which are incorporated in the machine to protect against belt failure;

Fig. 6 is a fragmentary side elevational view of the belt safety means;

Fig. 7 is a fragmentary perspective view showing the switch and the switch actuator incorporated in the belt safety means; and Fig. 8 is a schematic diagram of a control circuit for the machine.

Figure 3:
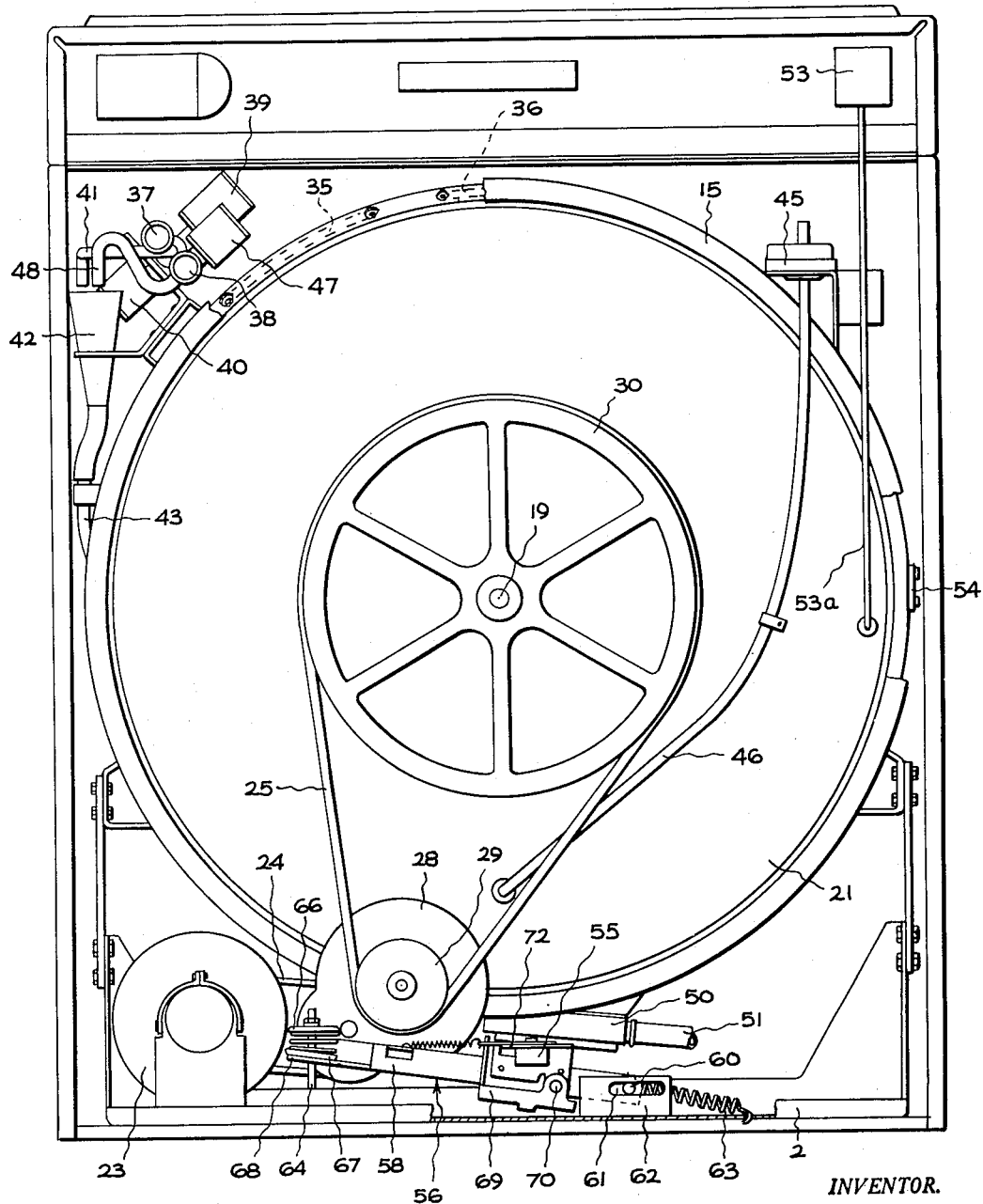
Fig. 3 is a rear view of the machine with the rear panel removed to illustrate details.

Referring now to Fig. 1, I have shown therein a domestic laundry machine comprising a combination washer and dryer. The operating elements of the machine are included within an outer cabinet structure including a wrap-around central section 1. The central section 1 is supported on a base and toe-board assembly 2 and carries a separate top 3 provided with an integral back-splash panel 4. Access to the interior of the machine is provided by a door 5 mounted on concealed hinges and opened by means of a knee-operated latch control number 6.

The machine is so constructed that when a load of soiled clothes is placed therein, it proceeds through a sequence of operations, first washing the clothes and then drying them. In order to provide complete flexibility of operation of the machine a number of operator controls are included therein, these controls being mounted on the back-splash panel 4. The controls include, for example, a plurality of push buttons consisting of an "off" button 7, hot and warm water buttons 8 and 9, a dryer control button 10, and a water heater button 11. A rotatable control knob 12 is provided for convenient operator selection of any separate sequence of operation, and a second control knob 13 is included for operator selection of operating temperatures for the drying portion of the cycle of operation. A suitable washer-dryer control system including these controls is described and claimed in the copending application of Walter E. Gray, Jr., S. N. 512,612, filed June 2, 1955, and assigned to the same assignee as the present invention. It will be understood, however, that my invention as described hereinafter is not limited to a machine having these particular controls. The above-described machine is merely intended to be exemplary of the various machines to which my invention may be applied.

As shown in Fig. 4, the machine is of the horizontal axis type. That is, it has a clothes basket or drum 14 mounted for rotation on a generally horizontal axis within an outer enclosing tub structure 15. The basket 14 comprises a cylindrical shell 16 which is closed at its rear end by means of a suitable wall or plate 17. The basket also includes a front wall 18 which is formed so as to define an access or loading opening to the basket. The basket is rotatably supported by a shaft 19 which is mounted in an elongated bearing 20, supported from the rear wall 21 of the tub. The tub is provided with an opening 22 in the front wall thereof, which is aligned with the access opening to the basket so that clothes may be placed into or removed from the basket. The door 5 (see Fig. 1) closes this opening 22 during operation of the machine.

During the operation of the machine the basket 14 is driven from an electric motor 23 through a drive including a pair of flexible belts 24 and 25 (see Figs. 2 and 3). The belt 24 connects the output pulley 26 of the motor 23 to the input pulley 27 of a transmission assembly 28. The belt 25 connects the output pulley 29 of the transmission assembly 28 to a basket drive pulley 30 mounted on the shaft 19 of the clothes-tumbling basket 14. The transmission assembly 28 is of the multiple speed type, that is, the ratio thereof can be changed so that the basket is driven at two different speeds. The transmission assembly thus provides one basket speed for clothes tumbling and another basket speed for centrifugal extraction. The ratio of the transmission assembly is changed by means of a suitable spring biased, solenoid actuated plunger 31. When the solenoid 32 controlling the plunger 31 is de-energized, the transmission ratio is such that the basket is driven at a suitable speed for washing and tumbling clothes, for example, 44 revolutions per minute. However, when the solenoid 32 is energized, the plunger 31 changes the ratio of the transmission so that the basket is driven at a suitable speed for centrifugal extraction, for example, 200 revolutions per minute.

During the operation of the machine the basket 14 is continuously rotated by means of this drive. A suitable sequence of operations through which the machine proceeds to wash and dry the clothes contained therein is described in the aforesaid Gray application S. N. 512,612. To warm the wash water during the washing portion of the cycle and also in order to heat the clothes during the drying portion of the cycle, there is provided in the machine a heater assembly including two heaters 35 and 36. These heaters are mounted within the upper portion of the tub 15 so that when energized, they heat the basket 14. The heating elements are preferably of the sheathed type in which a resistance wire is maintained in spaced relation with an outer sheath by a highly compressed, granulated, heat conducting, electrically insulating compound such as magnesium oxide. Such heating elements are sold under the trade name of "Calrod" and are available commercially. When the heaters are energized during the washing cycle, they heat the water by first heating the basket. Then as the basket dips into the wash water at the bottom of the tub, it in turns heats the water. In other words, the rotating basket serves as an effective heat transfer means between the heating elements and the water or other washing liquid. When the heaters are energized during the drying cycle, the heat transferred to the basket is then passed on to the clothes to cause vapor migration out of the clothes. Since the outer cylindrical shell of the basket is perforated, some of the heat from the heating elements passes directly to the clothes by radiation.

In order that the machine will not be damaged by the heat produced by the heaters 35 and 36, it is necessary that the basket 14 be rotating whenever they are energized. If either of the belts 24 and 25 fail, the basket 14, of course, stops rotating since it is then no longer connected to the motor 23. Therefore, by my invention, I have provided within the machine new and improved safety means whereby the heaters 35 and 36 are de-energized whenever either of the belts fail. These safety means will be described hereinafter in greater detail.

Although the means whereby water is admitted to and discharged from the tub 15 during operation of the machine are not essential to my invention, I have shown in Fig. 3 suitable means for accomplishing this water control. The water supply means includes connections 37 and 38 through which hot and cold water are supplied to the machine. A valve controlled by a solenoid 39 admits hot water to the machine and a valve controlled by an opposed solenoid 40 admits cold water to the machine. The hot and cold water valves under the control of the solenoids 39 and 40 discharge through a common outlet conduit 41. From the conduit 41 the inlet water passes through a suitable air gap into a funnel 42. The funnel 42 discharges a line 43 which leads into the interior of the tub 15 through a suitable connection 44 (see Fig. 4). The break or air gap provided by funnel 42 makes it impossible for water to be siphoned from the machine to contaminate the incoming water supply line. In the illustrated machine a pressure actuated sensing device 45 controls both the water solenoids 39 and 40 to maintain the proper water level in the machine during the washing operation. This sensing device is connected to the interior of tub 15 by a suitable line 46.

The illustrated machine is of the type which uses cold water during the drying cycle for condensing the moisture extracted from the wet clothes. This condenser water is admitted to the machine through an additional solenoid actuated valve controlled by a solenoid 47. The solenoid 47 is energized during the drying operation so the valve passes water at a slow rate sufficient to condense the moisture extracted from the clothes. As shown, the condenser water valve discharges into the funnel 42 through a separate conduit 48. An air gap between conduit 48 and the funnel prevents supply line contamination. From the funnel the condenser water flows through line 43 and connection 44 into the tub. The condenser water flowing slowly into the tub is spread over the side of the tub by a V-shaped bead 49 formed on the tub wall directly below connection 44. The condenser water being so spread out cools a substantial portion of the area of the side wall whereby there is provided a large cool surface for condensing the moisture extracted from the clothes.

The wash and rinse water used during the washing portion of the operation and the condenser water and the moisture extracted from the clothes during the drying operation are discharged from the machine through a fitting 50 mounted at the bottom of the tub. A suitable discharge hose 51 leads from the fitting to the household drain. The flow through the discharge line may be controlled by any suitable means, as for example, by a solenoid actuated drain valve or by a drain pump. In the illustrated machine a drain pump (not shown) is used to control the outlet flow.

The illustrated machine proceeds through a sequence of operations under the control of a sequence control 52 (Fig. 8) to wash and rinse the clothes, centrifugally extract the wash water therefrom and then dry the clothes. As mentioned above, a preferred sequence of operations is described in the Gray application S. N. 512,612. In this sequence the washing, rinsing and centrifugal extraction are timed operations of predetermined lengths. However, the drying operation may vary in length according to the amount of moisture which must be removed from the clothes. Specifically, a hydraulic-type thermostat 53 connected to a sensing bulb within the rear of the tub controls the duration of the drying cycle so as to terminate machine operation once the clothes have dried. The thermostat is connected to the sensing bulb by a suitable hydraulic line 53a. A safety thermostat 54 provides over-temperature protection during the entire operation of the machine.

As mentioned above, the machine is so constructed and arranged that the basket 14 rotates continuously during the operation thereof. By my invention, means are provided whereby a safety switch is operated if either of the basket drive belts 24 or 25 should fail and thereby stop basket rotation. In the illustrated embodiment the safety switch comprises a toggle switch 55 and the means for actuating it comprise a movable frame or sled 56 which mounts the transmission assembly 28.

The frame 56 includes a base 57 on which transmission assembly 28 is secured, and sides 58 and 59 attached to the base. The frame 56 is so mounted that it is capable of compound movement, or in other words, it is so mounted that it can move in two different ways. Specifically, the frame or sled is mounted by means of a pin or rod 60 which extends through suitable apertures in its sides 58 and 59. The rod 60 is held by elongated slots 61 in a U-shaped support member 62 fixedly secured to the base 2 of the machine. One movement of the frame is effected by its pivoting around the rod 60, whereas the other movement of the sled is effected by its moving with the rod in the direction of the slots 61.

A tension spring 63 is mounted between the rod 60 and the base 2 so that it tends to pull the frame 56 to the right as viewed in Figs. 3 and 6. In other words, it biases the frame to move away from the motor 23. The spring thereby tends to pull the transmission 28 away from the motor and in this manner places the belt 24 under tension between motor pulley 26 and transmission input pulley 27. The belt 24 holds the frame or sled in the position shown preventing it from moving further away from the motor 23.

An upstanding pin 64 mounted on the base 2 guides the frame in its pivotal movement around the rod 60. The pin 64 (see Fig. 3) is positioned adjacent to the end of the frame remote from rod 60, and a compression spring 65 mounted on the pin between suitable retaining elements 66 and 67 biases this remote end 68 of the frame downwardly. The spring 65 thereby biases the transmission 28 downwardly and places the belt 25 under tension between transmission output pulley 29 and basket drive pulley 30. The belt 25, of course, prevents the transmission and the frame from pivoting further downward than the illustrated position.

Since it is the belts 24 and 25 which prevent the frame 56 from moving under the force of springs 63 and 65, a movement of the frame or sled 56 results if either of the belts break. If the belt 24 breaks, spring 63 moves the frame in the direction of the slots 61 away from the motor 23. If the belt 25 breaks, the spring 65 causes the frame to pivot downwardly around the pin 60.

By my invention either of these movements of the frame results in the safety switch 55 being operated. In order to operate the switch 55 there is pivotally mounted on the side 58 of the frame an L-shaped trigger element 69. Specifically, the L-shaped trigger is mounted thereon by a pivot pin 70. The trigger is disposed so that the upstanding leg 71 thereof engages a switch actuating member 72 (see Fig. 6). This member 72 is slidably mounted on a bracket 73 secured to side 58 of the frame. The bracket 73 in addition to slidably mounting the switch actuator or slide 72 also holds the switch 55, the switch casing being fixedly secured thereto. The switch actuating plate 72 is biased by means of a tension spring 74 secured between it and the frame 56 so that it tends to move to the left on the bracket 73 (as viewed in Figs. 5–7) to operate the switch. However, the slide 72 is normally restrained from movement by means of a depending tab 75 provided thereon which engages an arm 76 of the bracket 73.

The tab 75 and the bracket arm 76 form a detent means normally locking actuator slide 72 in the illustrated position. However, if the actuator slide 72 is raised upwardly by means of the arm 71 of the trigger, the tab 75 clears the arm 76, allowing the slide to move to the left (as viewed in Figs. 5–7). As the slide 72 moves to the left, it carries operating button 77 of the switch 55 with it and thereby operates the switch. To effect this action the trigger arm 71 may be engaged with the slide 72 in any suitable manner, and likewise any suitable connection may be provided between the slide 72 and the switch button 77. The notches 78 in trigger arm 71 and the recess 79 in slide 72, however, comprise the preferred means of respectively connecting the trigger arm to the slide and the slide to the switch button (see Fig. 7). As shown, the notches 78 engage the sides of a slot 80 in the slide, and the recess 79 fits around the switch button 77. It will be noted incidentally that the slide is held on the bracket 73 by means of an offset portion 81 thereof which fits through a slot 82 in the bracket so as to engage the underside of the bracket.

As pointed out above, the springs 63 and 65 so bias the frame or sled 56 that the belts 24 and 25 are placed under tension. If either of these belts breaks, a movement of frame 56 results. Trigger 69 is effective to disengage the detent means 75—76 upon either type of movement of the frame or sled 56, thereby to cause the slide 72 to operate the switch upon either type of movement. If the belt 24 should break so that the sled moves to the right as viewed in Figs. 3 and 5–7, the lower end 83 of the trigger engages the support 62 fixed to the base 2 of the machine. As the frame 56 continues to move, the trigger is pivoted upwardly around pin 70 so as to lift slide 72. This disengages the detent means by lifting tab 75 over arm 76 and allows slide 72 to move under the bias of the spring 74. The movement of the slide, of course, operates the switch 55. Conversely, if the belt 25 should break so that the frame 56 pivots downwardly around the pin 60, a protuberance 84 on the bottom of the trigger 69 engages the base 2 of the machine. The trigger then remains stationary as the frame continues to pivot. As the frame moves relative to the trigger, the trigger lifts slide 72 and disengages tab 75 from the arm 76. The slide then moves under the bias of the spring 74 and operates switch 55.

From the above it will be seen that by my invention I have provided a novel arrangement whereby a safety switch is operated upon the failure of either of the drive belts. This safety switch may, of course, be incorporated in any suitable electrical control circuit for the machine. By way of example I have shown in Fig. 8 a simplified circuit incorporating the switch 55. This circuit utilizes the sequence control 52 to energize the various elements of the machine including the heating elements 35 and 36. However, for purposes of simplicity and ease of understanding only the heating elements 35 and 36 are shown. Power is supplied to the circuit from a pair of supply conductors 85 and 86, and the heaters are connected directly to line 85 and are connected to line 86 through the sequence control 52.

The belt safety switch 55 is connected in series circuit relation in the line 87 connecting the heating elements to the sequence control 52. Thus whenever the sequence control operates to apply power to the heaters the current must pass through the belt switch 55. If either of the belts 24 and 25 should break, the switch 55 is operated from the position illustrated wherein it closes the contacts 88 and 89 to a second position wherein it closes the contacts 88 and 90. This opens the heater circuit, de-energizing the heaters 35 and 36 so that the machine is not damaged due to the discontinuance of basket rotation. The de-energizing of the heaters prevents any over-heating of the machine from occurring.

It will be noted that the opening of the heater circuit also results in the timer motor 91 of the sequence control being energized through contacts 88—90 and line 92 so long as the control 52 tries to apply power to the heaters. This is to insure that the timer rotates the sequence control until it shuts the entire machine "off." As mentioned above, in the illustrated machine the thermostat 53 determines the length of the drying cycle. The timer normally is not energized during the drying cycle to rotate the sequence control to its "off" position until a predetermined temperature is reached within the machine. At that time the thermostat 53 opens contacts 93—94 so as to de-energize the heaters, and simultaneously closes contacts 93—95 so as to energize the timer through line 96. Since the thermostat can not be heated to close contacts 93—95 and energize the timer when contacts 88—89 of the safety switch are open, the contacts 88—90 and line 92 provide a shunt circuit for energizing the timer upon the occurrence of a belt failure. Power is supplied to the timer through this circuit so that it rotates the sequence control to the machine "off" position even though the thermostat does not close contacts 93—95.

Besides the connection 87 extending to the belt switch, the thermostat and the heaters, the sequence control 52 also is provided with a connection 97 extending to the timer motor 91. The timer motor 91 is normally energized during the phases of machine operation other than drying by means of this line 97 so that it continuously rotates the control during those phases. The other operating elements of the machine such as the drive motor, the water valves, the discharge pump, etc. are all energized by the control 52 through suitable connections (not shown). It will be understood, of course, that I do not intend in Fig. 8 to show the complete control for the machine in detail, whereby these latter connections are not included therein. Rather Fig. 8 is intended to show only one manner in which the belt safety switch 55 may be connected in a circuit so as to de-energize the heaters upon failure of either of the belts. The belt safety switch may, of course, be used in any suitable circuit within a laundry machine and my invention is in no way limited to the particular circuit illustrated.

While in accordance with the patent statues I have described what at present is considered to be the preferred embodiment of my invention, it will be obvious to those skilled in the art that numerous changes and modifications may be made therein without departing from my invention, and I, therefore, aim in the appended claims to cover all such changes and modifications as fall within the true spirit and scope of my invention.

What I claim as new and desire to secure by Letters Patent of the United States is:

1. In laundry apparatus, a motor, a rotatable clothes-treating basket, means for driving said basket from said motor including a power transmission means having input and output pulleys, driving and driven belts connected respectively to said pulleys, a movable frame mounting said power transmission means, resilient means biasing said frame to apply tension to said belts and effective to cause movement of said frame upon failure of either of said belts, a switch, and means actuated by the movement of said frame for operating said switch whereby said switch is operated upon the failure of either of said belts.

2. In laundry apparatus, a motor, a rotatable clothes-treating basket, a drive pulley for turning said basket, a power transmission having an input pulley and an output pulley, a first belt connecting said input pulley to said motor, a second belt connecting said output pulley to said basket drive pulley, a movable frame mounting said power transmission, spring means biasing said frame to apply tension to said belts and effective to cause movement of said frame upon failure of either of said belts, a switch, and means actuated by the movement of said frame for operating said switch, whereby said switch is operated upon the failure of either of said belts.

3. In laundry apparatus, a motor, a rotatable clothes-treating basket, means for driving said basket from said motor including a power transmission means having input and output pulleys, driving and driven belts connected respectively to said pulleys, a movable frame mounting said power transmission means, resilient means biasing said frame to apply tension to said belts and effective to cause movement of said frame upon the failure of either of said belts, a switch and a movable switch actuator both mounted on said frame, resilient means biasing said actuator for movement effective to operate said switch, detent means normally preventing said movement of said actuator, a trigger pivotally mounted on said frame for disengaging said detent means to allow said movement of said actuator, and stationary means positioned to engage said trigger upon movement of said frame thereby to cause a pivoting of said trigger effective to disengage said detent means, whereby said actuator is released to operate said switch upon failure of either of said belts.

4. In a laundry machine, a motor, a rotatable clothes-treating basket, means for driving said basket from said motor including a power transmission means having input and output pulleys, and a pair of belts each connected to one of the pulleys, a movable frame mounting said power transmission means, a support having elongated slots, a rod disposed in said slots and mounting said frame whereby said frame is pivotable around said rod and is movable with said rod in the direction of said slots, spring means biasing said frame to apply tension to said belts, said spring means being effective to cause pivotable movement of said frame upon the failure of one of said belts and a movement of said frame in the direction of said slots upon the failure of the other of said belts, a switch, and means actuated by either movement of said frame for operating said switch whereby said switch is operated upon the failure of either of said belts.

5. The combination of claim 4 including a movable switch actuator mounted on said frame, a spring biasing said switch actuator for a movement effective to operate said switch, detent means normally preventing said movement of said actuator, a trigger pivotally mounted on said frame for disengaging said detent means to allow said movement of said actuator, and stationary means positioned to contact said trigger on either movement of said frame thereby to cause a pivoting of said trigger effective to disengage said detent means, whereby said actuator is released to operate said switch upon the failure of either of said belts.

6. In a laundry appliance, a base, a motor mounted on said base, a rotatable clothes-treating basket, a drive pulley for turning said basket, a transmission having an input pulley and an output pulley, a first belt connecting said input pulley to said motor and a second belt connecting said output pulley to said basket drive pulley, said basket drive pulley being positioned above said transmission output pulley and said motor being positioned transversely of said transmission input pulley, a frame mounting said transmission, a support mounted on said base having elongated slots, a rod disposed in said slots and mounting said frame whereby said frame is pivotable around said rod and is movable with said rod in the direction of said slots, resilient means engaging said frame to apply tension to said belts, said resilient means being effective to cause pivotable movement of said frame upon the failure of said second belt and movement of said frame in the direction of said slots upon the failure of said first belt, a switch, and means actuated by either of said movements of said frame for operating switch whereby said switch is operated upon the failure of either of said belts.

No references cited.